(12) United States Patent
Ling et al.

(10) Patent No.: US 12,355,545 B2
(45) Date of Patent: Jul. 8, 2025

(54) SATELLITE-BASED BLOCKCHAIN ARCHITECTURE

(71) Applicant: Southeast University, Jiangsu (CN)

(72) Inventors: Xintong Ling, Jiangsu (CN); Pengcheng Chen, Jiangsu (CN); Zheng Gao, Jiangsu (CN); Yuwei Le, Jiangsu (CN); Jiaheng Wang, Jiangsu (CN); Li You, Jiangsu (CN); Xiqi Gao, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 357 days.

(21) Appl. No.: 18/025,046

(22) PCT Filed: Sep. 22, 2021

(86) PCT No.: PCT/CN2021/119516
§ 371 (c)(1),
(2) Date: Mar. 7, 2023

(87) PCT Pub. No.: WO2022/068637
PCT Pub. Date: Apr. 7, 2022

(65) Prior Publication Data
US 2023/0327752 A1    Oct. 12, 2023

(30) Foreign Application Priority Data
Sep. 30, 2020 (CN) .......................... 202011062578.1

(51) Int. Cl.
*H04B 7/185* (2006.01)
*H04L 9/00* (2022.01)

(52) U.S. Cl.
CPC ........... *H04B 7/18526* (2013.01); *H04L 9/50* (2022.05)

(58) Field of Classification Search
CPC .............. H04B 7/18526; H04B 7/1851; H04B 7/18523; H04B 7/1853; H04B 7/18513;
(Continued)

(56) References Cited

U.S. PATENT DOCUMENTS

| 2008/0242313 A1* | 10/2008 | Lee ........................ H04W 88/02 |
| 2019/0087844 A1* | 3/2019 | Leekley ............... H04B 7/1851 |

(Continued)

FOREIGN PATENT DOCUMENTS

| CN | 108400872 A | 8/2018 |
| CN | 109977166 A | 7/2019 |

(Continued)

OTHER PUBLICATIONS

Ling. Xintong et al. "Satellite-Aided Consensus Protocol for Scalable Blockchains" *sensors 2020*, Oct. 1, 2020, pp. 1-13.

(Continued)

*Primary Examiner* — Lana N Le
(74) *Attorney, Agent, or Firm* — MUNCY, GEISSLER, OLDS & LOWE, P.C.

(57) ABSTRACT

The present invention discloses a satellite-based blockchain architecture, including a terrestrial blockchain miner network, a constellation system, and a consensus protocol coordinating the constellation system and the terrestrial blockchain miner network. In each round, a satellite generates an oracle, and satellites broadcast the oracle to the terrestrial blockchain miner network. The oracle selects a terrestrial miner as a winner of the current round based on a specific rule. The winning terrestrial miner has the right to generate a new block in the round, and broadcasts the new block to other miners by using the terrestrial blockchain miner network. Other miners receiving the new block check the validity of the block, and if the check succeeds, the block is broadcast to other miners by using the terrestrial block- (Continued)

chain miner network. The present invention significantly improves the efficiency and throughput of a blockchain, and optimizes and reduces the energy consumption of executing a consensus protocol by a terrestrial blockchain miner network.

8 Claims, 6 Drawing Sheets

(58) Field of Classification Search
CPC ... H04B 7/18578; H04B 7/18586; H04L 9/50; H04L 2209/56; Y02D 30/70; H04W 4/029; H04W 64/00; H04W 84/06; H04W 84/10; H04W 88/02; H04W 4/02; H04H 20/59; G01S 19/258; G01S 19/254; G01S 19/25; G01S 19/32; G01S 19/33; G01S 5/0036

See application file for complete search history.

(56) References Cited

U.S. PATENT DOCUMENTS

| | | | |
|---|---|---|---|
| 2021/0027265 A1* | 1/2021 | Hasek | H04L 9/50 |
| 2021/0083847 A1* | 3/2021 | Krishnan | H04L 9/50 |
| 2023/0336241 A1* | 10/2023 | Kim | H04B 7/1853 |

FOREIGN PATENT DOCUMENTS

| | | | |
|---|---|---|---|
| CN | 108400872 B | * 12/2019 | ......... H04B 7/18578 |
| CN | 112202487 A | 1/2021 | |

OTHER PUBLICATIONS

Zhang, Yinghao et al. "Satellite Broadcasting Enabled Blockchain Protocol: a Preliminary Study" *2020 Injc Irmation Communication Technologies Conference (JCTC)*, Jun. 23, 2020, pp. 1-7.

* cited by examiner

SATELLITE-BASED BLOCKCHAIN ARCHITECTURE

TECHNICAL FIELD

The present invention relates to the field of blockchains, and specifically, to a satellite-based blockchain architecture.

BACKGROUND

In 2008, the birth of bitcoin sparked widespread attention among financial practitioners. As the core technology behind bitcoin, a blockchain has gradually entered the field of vision of researchers. As a public classified ledger and database, a blockchain has advantages such as decentralization, tamper resistance, openness and transparency, collective maintenance, trackability, and traceability. The consensus mechanism is the core of a blockchain, that is, a distributed ledger technology. A blockchain is based on a specific consensus mechanism and uses appropriate financial incentives to motivate miners in a blockchain network to maintain an open and orderly ledger together. Proof of Work (PoW) was first proposed in 1992 and has become the most popular consensus mechanism since the release of bitcoin in 2008, and the great success of PoW in the field of cryptocurrency is a testament to its robustness against misconduct and malicious attacks.

However, the PoW consensus mechanism consumes massive energy and wastes enormous resources. In existing alternatives to PoW, other capabilities of miners rather than the computational power required in PoW are used for mining. However, new potential security hazards are usually caused, and the existing blockchains will also suffer from serious scalability problems due to the constraints of consensus mechanisms. Transactions per second (TPS), a measure of the throughput of a blockchain, is quite low in a conventional blockchain. There are at most 7 transactions per second for bitcoin and at most 15 transactions per second for Ethereum. In comparison, centralized trading platforms such as PayPal and VISA may reach network throughput of thousands of TPS. In short, high energy consumption and low throughput are two main obstacles that severely limit the development of blockchain technology.

Satellite technology has attracted the attention of more and more researchers for its advantages such as wide coverage, ubiquitous connectivity, and stable downlinks. Currently, only a few research works have discussed the applicability of satellites in blockchain. In most existing research works, satellites are used as relays to forward blocks to an area lacking a terrestrial blockchain miner network or deficient in terrestrial blockchain miner network services, or satellites are used to accelerate the propagation of information in a terrestrial blockchain miner network. An uplink is the difficulty in such researches. Ordinary users need to use specific authorized ground stations to upload newly generated blocks, which raises the access threshold, increases the costs of using such services for ordinary users, and reduces the decentralization of a blockchain.

SUMMARY

Inventive objective: To overcome main obstacles that limit the development of blockchain technology, the present invention provides a satellite-based blockchain architecture, to fully utilize advantages that satellite technology has wide coverage and can provide ubiquitous connectivity, deeply integrate the blockchain technology and the satellite technology, and use unique advantages of satellites to improve the blockchain consensus mechanism, thereby reducing the waste of resources and effectively improving the performance of blockchains. In addition, the consensus mechanism only utilizes the downlinks of satellites, so that the access threshold is greatly lowered for users, thereby further enhancing the decentralization of a blockchain.

To achieve the foregoing objective, the technical solutions adopted in the present invention are as follows:

A satellite-based blockchain architecture includes a terrestrial blockchain miner network, a constellation system formed by a plurality of satellites, and a consensus protocol coordinating the constellation system and the terrestrial blockchain miner network. In each round, a satellite generates an oracle, and broadcasts the oracle to the terrestrial blockchain miner network. The oracle selects a terrestrial miner as a winner of the current round based on a specific rule. The winning terrestrial miner has the right to generate a new block in the round, and broadcasts the new block to other miners by using the terrestrial blockchain miner network. A miner receiving the new block checks the validity of the block, and if the check succeeds, the block is broadcast to other miners by using the terrestrial blockchain miner network.

The satellites include geostationary earth orbit satellites, medium earth orbit satellites, and low earth orbit satellites. The terrestrial blockchain miner network includes more than one terrestrial miner. The terrestrial miners are communicatively connected to each other via network. The satellites are communicatively connected to each other via network.

The consensus protocol coordinating the constellation system and the terrestrial blockchain miner network includes the following steps:

Step 1: A satellite generates an oracle in each round.

The satellite generates the oracle by using two methods, denoted as a first oracle generation method and a second oracle generation method.

In the first oracle generation method, a satellite measures physical quantities such as cosmic rays, hydromagnetic waves, and instantaneous radiations in real time by using satellite-borne measuring instruments, and numerical conversion is performed to generate the oracle. However, in this oracle generation manner, it is necessary to order and purchase corresponding services from a satellite operator, leading to an increase in the maintenance cost. In the second oracle generation method, satellites are used to broadcast data packets for satellite television, a global positioning system or other specific use to the ground, and numerical conversion is performed to generate the oracle. In this generation manner, the satellite is not aware of the participation in the generation of the oracle and the maintenance of a blockchain, and therefore it is not necessary to purchase any satellite service. However, this manner may affect the randomness of the oracle, which is more likely to be manipulated by malicious terrestrial miners. Therefore, a balance is to be reached between the security and cost in terms of the generation of the oracle. During practical application, a generation method should be selected according to objectives and requirements of a blockchain.

Step 2: The satellites broadcast the oracle generated in step 2 to the terrestrial blockchain miner network. The broadcast oracle is digitally signed by the satellite generating the oracle to prevent fraudulence, and subsequently the oracle is packed in a newly generated block for other terrestrial miners to verify the validity of the oracle.

Step 3: A terrestrial miner in the terrestrial blockchain miner network receives, by using a terrestrial receiving terminal, the oracle generated in step 2, and determines, according to a specific rule, whether the terrestrial miner is selected.

It is relatively risky to directly choose a terrestrial miner as a winner of a round according to the oracle. The reason is that a malicious miner may create a plurality of identities to initiate the Sybil attack to increase a probability of being selected. The specific rule herein can adequately solve this problem.

The specific rule is the principle of the proof of stake consensus mechanism. The oracle is mapped to an index in a list of all current existing crypto-currencies, and an owner of a crypto-currency corresponding to the index is a winner of a current round. Under the rule, a probability that each miner wins is only related to a crypto-currency that the miner holds, and does not increase as a quantity of identities of the miner increases, thereby effectively resisting the Sybil attack.

Step 4: A selected terrestrial miner generates a new block at the top of an existing blockchain, and broadcasts the new block to other terrestrial miners by using the terrestrial blockchain miner network.

Step 5: A remaining terrestrial miner checks the validity of the new block after receiving the new block; and if the check fails, discards the block; or if the check succeeds, continues to broadcast the block to other terrestrial miners by using the terrestrial blockchain miner network.

Through the broadcasting of the satellites and the forwarding in the terrestrial blockchain miner network, most terrestrial miners receive the oracle, and after the validity of a new block is verified, the length of the blockchain is increased by 1. This cycle is repeated, and the blockchain grows as new blocks are built on original blocks.

According to different heights of motion orbits, the satellites may include geostationary earth orbit satellites, medium earth orbit satellites, and low earth orbit satellites. The geostationary earth orbit satellites are stationary relative to Earth's surface, the Doppler shift is ignorable, and a probability of a transmission interruption is lower than a non-geostationary earth orbit satellite. In addition, the geostationary earth orbit satellite works in an orbit at an altitude of approximately 35,786 kilometers. One geostationary earth orbit satellite can cover one third of Earth's surface. With the advantages of low probability of transmission interruption and wide coverage, the geostationary earth orbit satellite is a preferred satellite in this patent.

In the case of a plurality of satellites, the consensus protocol gives a predefined protocol to determine the satellite used for generating an oracle in each round. In the first oracle generation method, the consensus protocol determines a sequence in a pseudorandom manner, and the satellites in the constellation system generate oracles in turn according to the sequence. In the second oracle generation method, the consensus protocol gives a predefined protocol to determine a specific satellite, and the satellite broadcasts a data packet for specific use in a specific time slot at a specific frequency band to generate the oracle.

Preferably, the terrestrial receiving terminal includes portable mobile receivers or very small aperture terminals.

Compared with the prior art, the present invention can fully utilize the technical advantages of satellites to improve blockchain consensus mechanism, to provide the following beneficial effects:

1) Compared with the widely known PoW consensus mechanism, the present invention greatly reduces the energy consumption of a consensus process, thereby significantly improving the throughput of blockchain.

2) The present invention deeply integrates satellite technology and blockchain technology, and fully utilizes the advantages of wide coverage, ubiquitous connectivity, and stable downlinks of the satellite technology, thereby substantially improving the efficiency of a consensus process.

3) Compared with existing researches of combining blockchain and satellite, in the present invention, miners do not need to access an uplink of satellites, so that the access threshold is lowered for users, the deployment efficiency is greatly improved, and miners only need to use devices that can receive satellite broadcasting to access the satellite-based blockchain architecture.

4) In the present invention, instead of performing complex processing operations or generating, forwarding, storing, and verifying a block, a satellite only needs to broadcast an oracle, so that satellite-borne processing requirements and launch costs are significantly reduced, which is conducive to the promotion and popularization in the future.

DETAILED DESCRIPTION OF THE EMBODIMENTS

The present invention is further described below with reference to the accompanying drawings and specific embodiments. It should be understood that these examples are intended only to describe the present invention but not to limit the scope of the present invention. Various modifications in equivalent form made to the present invention by those skilled in the art after reading the present invention all fall within the scope defined by the appended claims of the present application.

Figure 1:
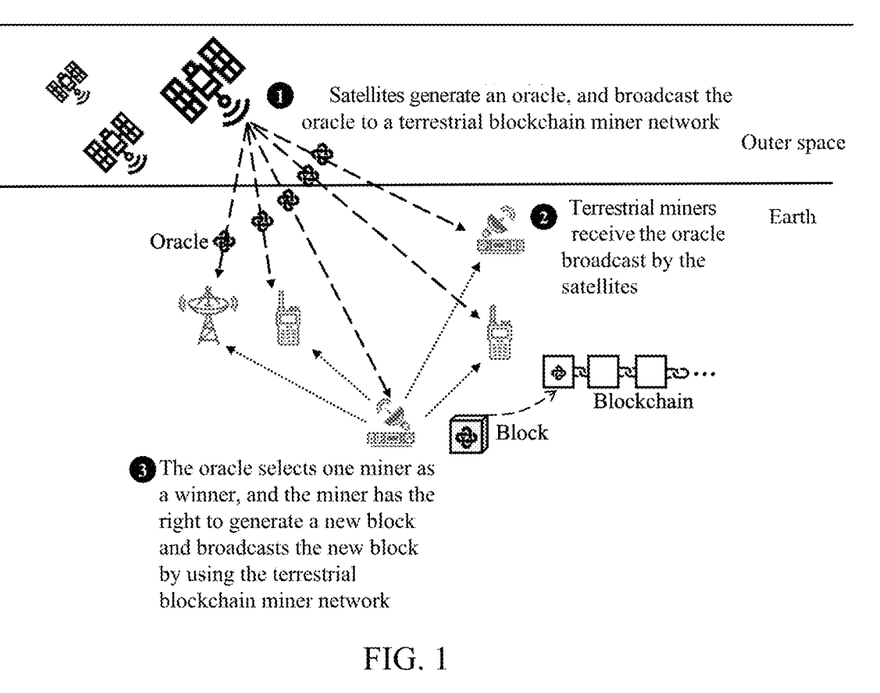
FIG. 1 is a schematic diagram of a satellite-based blockchain architecture.
Figure 2:
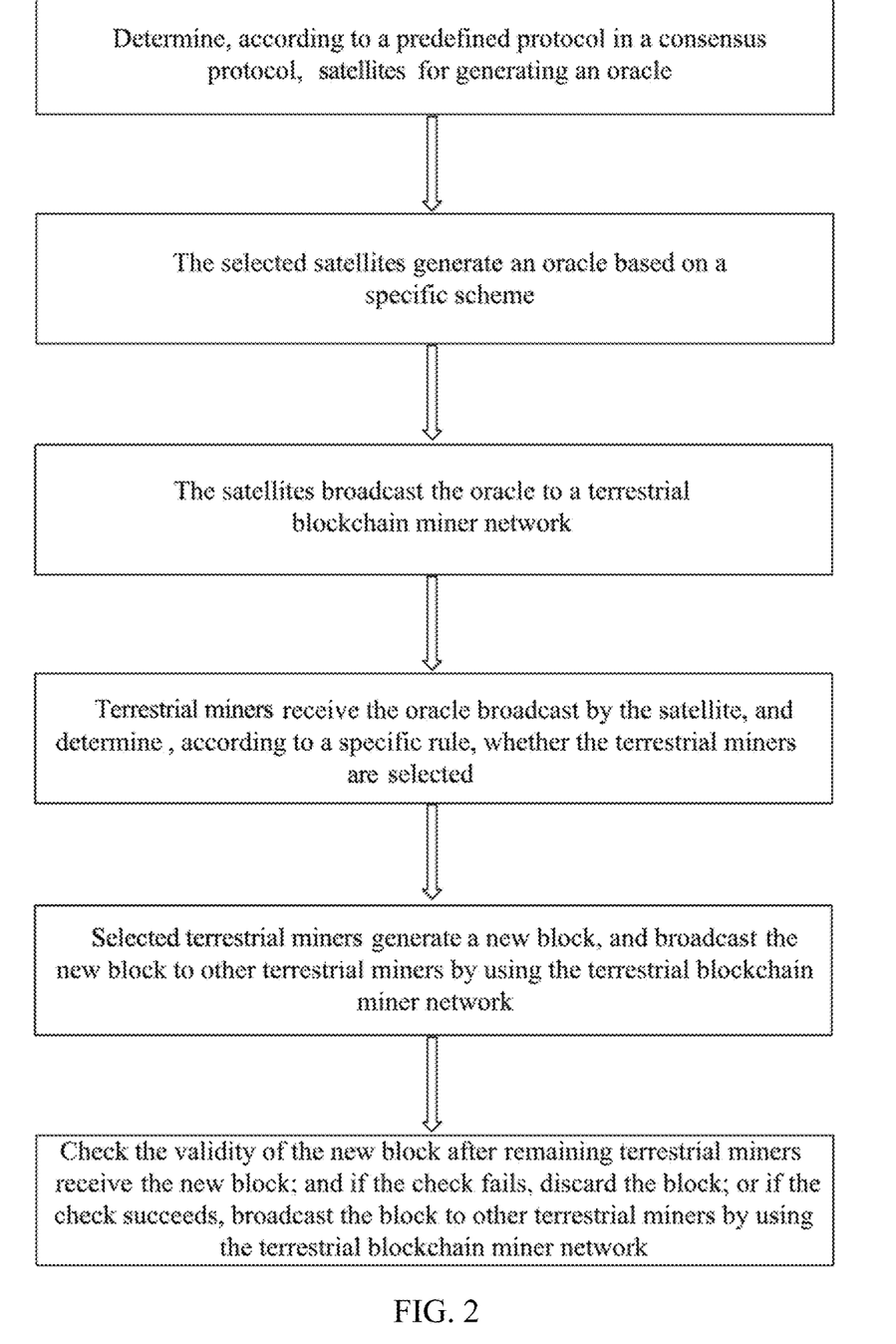
FIG. 2 is a schematic diagram of a working procedure of a satellite-based blockchain architecture.

As shown in FIG. 1 and FIG. 2, the satellite-based blockchain architecture includes a constellation system formed by three geostationary earth orbit satellites, a terrestrial blockchain miner network formed by five terrestrial miners, and a consensus protocol coordinating the constellation system and the terrestrial blockchain miner network.

1) A satellite measures physical data such as cosmic rays, hydromagnetic waves, and instantaneous radiations in real time by using satellite-borne measuring instruments, and integration and numerical conversion are performed on the physical data to generate an oracle.
2) The satellite broadcasts the oracle generated by the satellite to the five miners in the terrestrial blockchain miner network.
3) A terrestrial miner receives, by using a terrestrial receiving terminal such as a portable mobile receiver and a miniature-antenna Earth station, the oracle generated by the satellite. As shown in FIG. 1, according to the principle of proof of stake, the lowermost terrestrial miner is selected in the first round, and receives the oracle broadcast by the satellite.
4) The terrestrial miner generates a new block, and broadcasts the new block to other terrestrial miners by using the terrestrial blockchain miner network.
5) A remaining terrestrial miner checks the validity of the new block after receiving the new block. After the check succeeds, the block continues to be broadcast to other terrestrial miners by using the terrestrial blockchain miner network.

Figure 3:
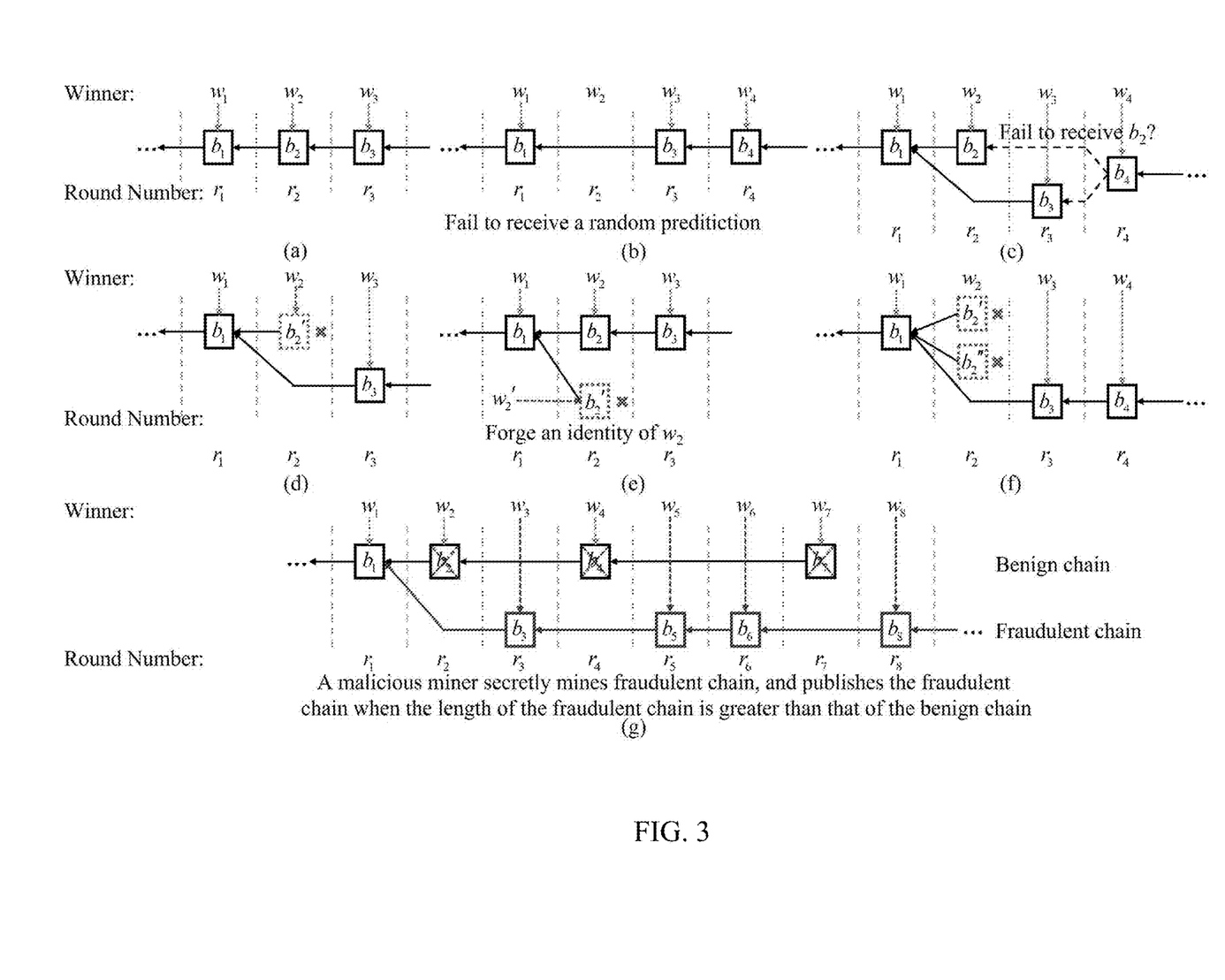
FIG. 3 is a schematic diagram of a blockchain evolution mode of a satellite-based blockchain architecture.

However, the network delay and the presence of misconduct of a satellite or miner may lead to various emergencies. For ease of description of various cases, FIG. 3 gives a schematic diagram of the blockchain evolution mode based on the novel blockchain consensus mechanism.

As shown in FIG. 3(a), in normal cases, according to the rule of proof of stake, a terrestrial miner $w_2$ is selected by an oracle as the winner in the second round. $w_2$ receives the oracle broadcast by a satellite, and then $w_2$ collects transactions in the terrestrial blockchain miner network, verifies the transactions, and packs the transactions. Next, $w_2$ generates a new block $b_2$ following a block $b_1$ generated by the winner $w_1$ in the first round, and uses the terrestrial blockchain miner network to broadcast $b_2$. $b_2$ includes a hash pointer pointing to $b_2$. When $w_2$ is selected in the third round, $w_1$ repeats a process similar to that of $w_2$ to generate $b_3$. This cycle is repeated, and the blockchain keeps growing.

As shown in FIG. 3(b), in the second round, due to an interruption in a satellite link, the terrestrial miner $w_2$ fails to receive the oracle broadcast by the satellite. Therefore, no new block is generated in the second round. In this case, the winning miner $w_3$, in the third round directly generates one block $b_3$ pointing to the block $b_1$.

As shown in FIG. 3(c), when generating the new block $b_3$, the winning miner $w_3$ in the third round fails to receive the block $b_2$ broadcast by the miner $w_2$ due to the network delay. $w_3$ generates the block $b_3$ pointing to the block $b_1$. In this case, the blockchain forks, and a winner in next round determines whether $b_2$ or $b_2$ is finally included in the main chain.

FIG. 3(d) reflects a case that the winning winner $w_2$ in the second round may have misconduct, generating an invalid block $b_2$. FIG. 3(e) reflects a case that the miner $w_2$, may forge an identity to generate an invalid block $b_2'$. It is very easy to discover the foregoing two cases during the verification of the block by other nodes. Therefore, the invalid blocks in the two cases are both excluded from the main chain.

FIG. 3(f) reflects a case that the winning $w_2$ in the second round may publish two new blocks at once, that is, the block $b_2'$ and a block $b_2''$, causing the blockchain to fork. Generally, honest miners discard such blocks.

FIG. 3(g) reflects a case that a malicious miner may privately mine in a fraudulent branch. When attacked transactions has been confirmed and the length of the fraudulent branch exceeds the length of the current main chain, the fraudulent branch is published, to achieve a "double-spending" attack.

Figure 4:
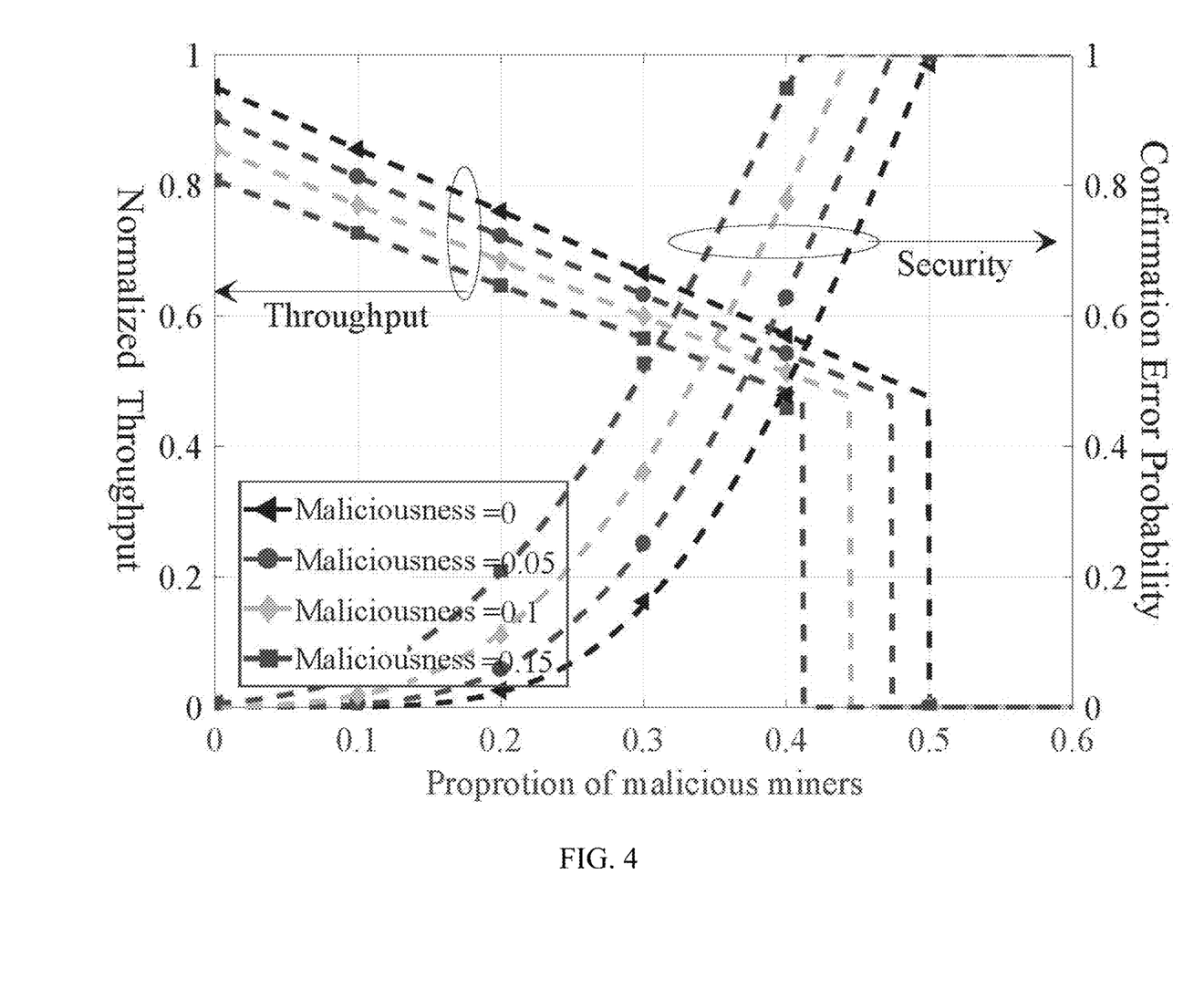
FIG. 4 is a simulation diagram of relationships between normalized throughput and security of the blockchain and a proportion of malicious terrestrial miners at different proportions of malicious satellites. It can be seen that when a proportion of malicious miners is higher, the normalized throughput and the security of the blockchain are lower. When the proportion of malicious satellites increases, the normalized throughput and the security of the blockchain also decrease.
Figure 5:
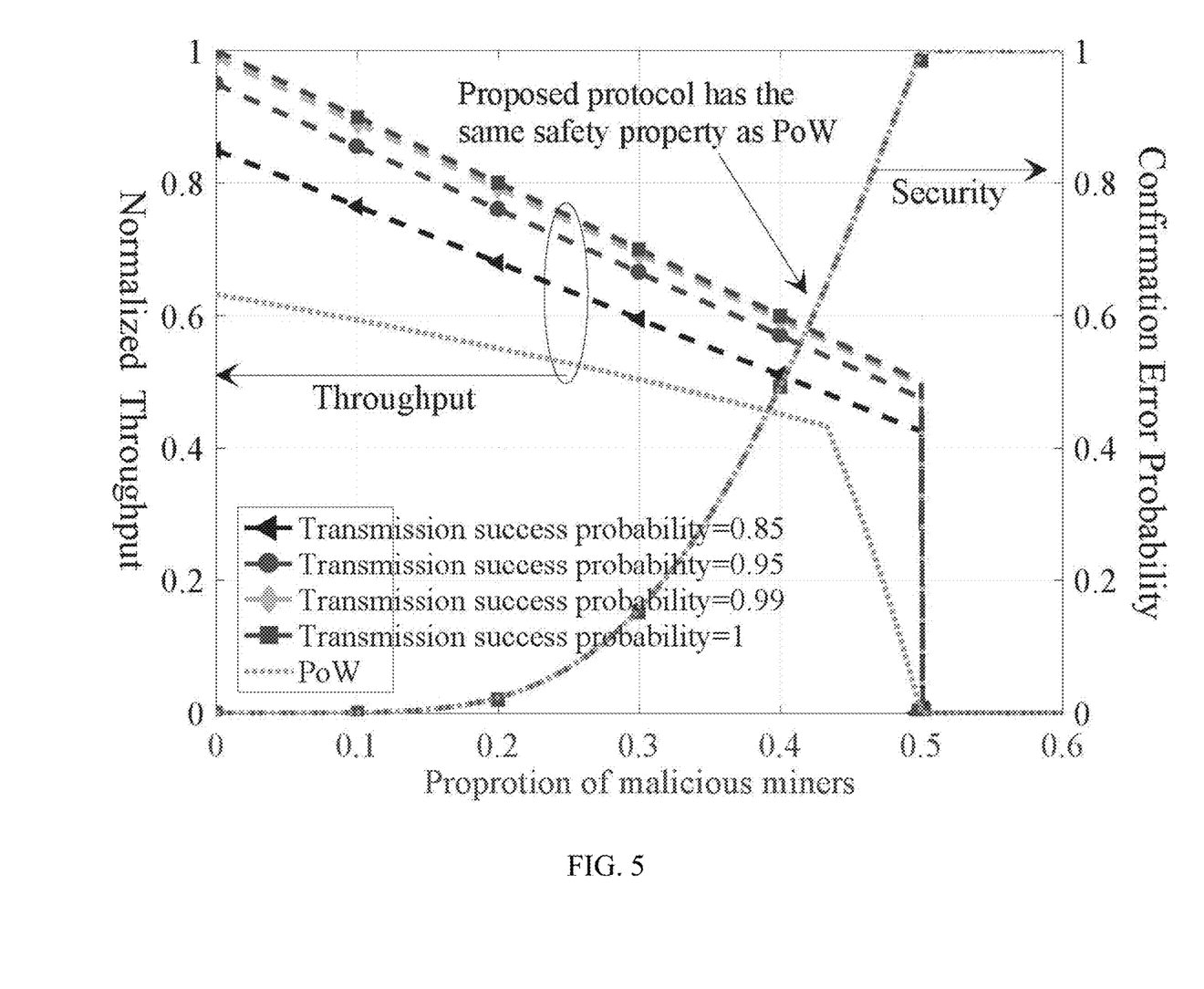
FIG. 5 is a simulation diagram of relationships between normalized throughput and security of the blockchain and a proportion of malicious entities (including malicious satellites and malicious miners) in the blockchain at different success probabilities of satellite transmission. It can be seen that when the proportion of malicious entities in the blockchain is higher, the normalized throughput and the security of the blockchain are lower.
Figure 6:
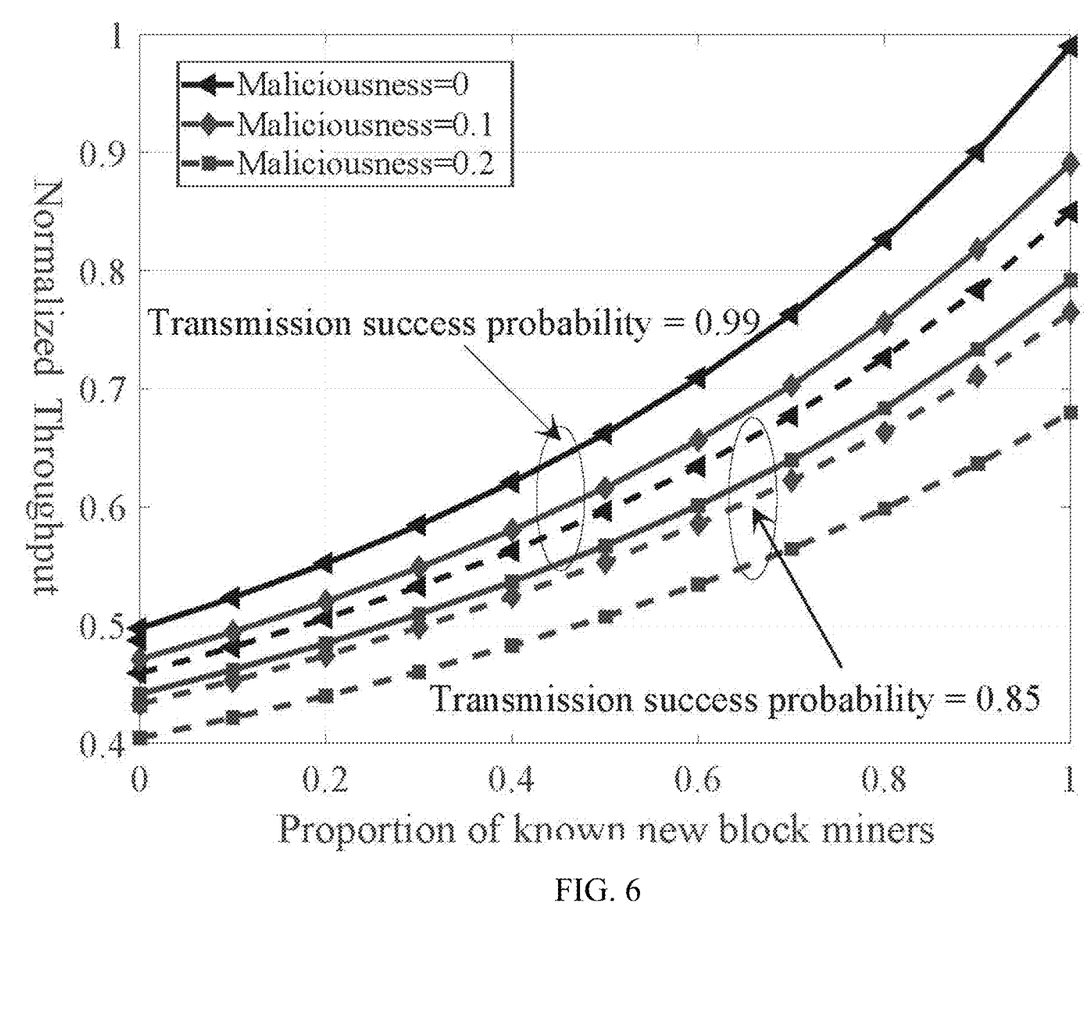
FIG. 6 is a simulation diagram of a relationship between normalized throughput of the blockchain and the network transmission delay. It can be seen that when the network transmission delay is lower, the normalized throughput of the blockchain is higher.

Referring to FIG. 4 to FIG. 6, to show the performance of the present invention during actual work, actual tests were performed and data was recorded for typical embodiments of the present invention. Analysis results are as follows.

FIG. 4 reflects relationships between normalized throughput and security of the blockchain and the proportion of malicious terrestrial miners at different proportions of malicious satellites. If the proportion of malicious satellites is constant, when the proportion of malicious miners in the terrestrial blockchain miner network is higher, the throughput of the blockchain is lower, the error confirmation probability is higher, and the security is lower. Similarly, if the proportion of malicious miners in the terrestrial miner network is constant, when the proportion of malicious satellites is higher, the throughput of the blockchain is lower, the error confirmation probability is higher, and the security is lower.

FIG. 5 reflects relationships between normalized throughput and security of the blockchain and the proportion of malicious entities in the blockchain at different success probabilities of satellite transmission and comparison between the present invention and PoW in terms of throughput and security. The analysis results show that in the case of the same security performance, the present invention has higher throughput compared with PoW. The throughput of the blockchain in the present invention largely depends on the quality of the satellite broadcast channel, that is, the transmission success probability. As the quality of the satellite channel improves, the transmission success probability is higher, and the throughput of the blockchain also increases correspondingly.

FIG. 6 reflects the relationship between throughput of the blockchain and the information propagation delay at different transmission success probabilities and different proportions of malicious entities. It can be seen that if the proportion of malicious entities is constant, when the proportion of new block miners is higher, the information propagation delay of the terrestrial blockchain miner network is lower, and the throughput of the blockchain is higher.

The present invention fully utilizes the advantages of wide coverage, ubiquitous connectivity, and stable downlinks of satellites to build a satellite-based blockchain architecture, so that the efficiency of the blockchain is significantly improved, and the energy consumption of executing the consensus protocol by a terrestrial blockchain miner network is optimized and reduced. The blockchain consensus mechanism is improved by fully utilizing the advantages of wide coverage, ubiquitous connectivity, and stable downlinks of satellites, so that compared with the conventional PoW consensus mechanism, the resource consumption is greatly reduced, and the system throughput is significantly improved.

The foregoing descriptions are preferred implementations of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A satellite-based blockchain architecture, comprising a terrestrial blockchain miner network, a constellation system, and a consensus protocol coordinating the constellation system and the terrestrial blockchain miner network, wherein
the terrestrial blockchain miner network comprises more than one terrestrial miner, and the terrestrial miners are communicatively connected via a network;
the constellation system is formed by three or more satellites, the satellites are communicatively connected to each other via a network, and the satellites and the terrestrial miners are communicatively connected to each other via a network; and
the consensus protocol coordinating the constellation system and the terrestrial blockchain miner network is used for generating an oracle by a satellite in the constellation system and controlling the constellation system to broadcast the oracle to the terrestrial blockchain miner network; a corresponding terrestrial miner in the terrestrial blockchain miner network has the right to generate a new block, and broadcasts the new block to other terrestrial miners by using the terrestrial blockchain miner network;
and other terrestrial miners receiving the new block checks the validity of the block, and if the check succeeds, the block is broadcast to other terrestrial miners by using the terrestrial blockchain miner network.

2. The satellite-based blockchain architecture according to claim 1, wherein the consensus protocol coordinating the constellation system and the terrestrial blockchain miner network comprises the following working steps:
step 1: generating, by a satellite, an oracle based on a specific scheme in each round;
step 2: broadcasting, by the satellites, the oracle to the terrestrial blockchain miner network, wherein the oracle is a random number used for determining a winning terrestrial miner in each round;
step 3: receiving, by terrestrial miners by using terrestrial receiving terminals, the oracle generated in step 1, and determining, according to a specific rule, whether the terrestrial miner is selected;
step 4: generating, by a selected terrestrial miner, a new block, and broadcasting the new block to the other terrestrial miners by using the terrestrial blockchain miner network; and
step 5: checking, the validity of the new block after the other terrestrial miners receive the new block; and if the check fails, discarding the block; or if the check succeeds, broadcasting the block to other terrestrial miners by using the terrestrial blockchain miner network.

3. The satellite-based blockchain architecture according to claim 2, wherein the satellite generates the oracle based on the specific scheme by using two methods, denoted as a first oracle generation method and a second oracle generation method; in the first oracle generation method, a geostationary earth orbit satellite measures cosmic rays, hydromagnetic waves, and instantaneous radiations in real time by using satellite-borne measuring instruments, and numerical conversion is performed to obtain the oracle; and in the second oracle generation method, a satellite is used to broadcast a data packet for satellite television, a global positioning system or other use to the ground, and numerical conversion is performed to generate the oracle.

4. The satellite-based blockchain architecture according to claim 3, wherein the specific rule comprises the following steps: mapping the oracle to an index in a list of currently generated crypto-currencies, and an owner of a crypto-currency corresponding to the index is a selected terrestrial miner in a current round.

5. The satellite-based blockchain architecture according to claim 4, wherein in the first oracle generation method, the consensus protocol determines a sequence in a pseudorandom manner, and the satellites in the constellation system generate oracles in turn according to the sequence; and in the second oracle generation method, the consensus protocol gives a predefined protocol to determine a specific satellite, and the satellite broadcasts a data packet for specific use in a specific time slot at a specific frequency band to generate the oracle.

6. The satellite-based blockchain architecture according to claim 5, wherein the satellites comprise geostationary earth orbit satellites, medium earth orbit satellites, and low earth orbit satellites.

7. The satellite-based blockchain architecture according to claim 6, wherein the constellation system provides ultra-wide ground coverage, ubiquitous connectivity, and stable downlinks.

8. The satellite-based blockchain architecture according to claim 7, wherein the terrestrial receiving terminal comprises a portable mobile receiver and a miniature-antenna Earth station.

* * * * *